(12) United States Patent
Tanabe et al.

(10) Patent No.: US 10,111,491 B2
(45) Date of Patent: Oct. 30, 2018

(54) SHOE SOLE, INSOLE OF SHOE, MAIN SOLE OF SHOE, AND SHOE

(71) Applicant: DIATEX Co., Ltd., Tokyo (JP)

(72) Inventors: Yohei Tanabe, Toyama (JP); Yoichi Mizushima, Toyama (JP); Ken Itoh, Toyama (JP)

(73) Assignee: Diatex Co., Ltd., Tokyo (JP)

( * ) Notice: Subject to any disclaimer, the term of this patent is extended or adjusted under 35 U.S.C. 154(b) by 98 days.

(21) Appl. No.: 15/121,018

(22) PCT Filed: Feb. 19, 2015

(86) PCT No.: PCT/JP2015/054690
§ 371 (c)(1),
(2) Date: Aug. 23, 2016

(87) PCT Pub. No.: WO2015/129555
PCT Pub. Date: Sep. 3, 2015

(65) Prior Publication Data
US 2017/0006962 A1    Jan. 12, 2017

(30) Foreign Application Priority Data

Feb. 25, 2014 (JP) ................................ 2014-034286
Apr. 28, 2014 (JP) ................................ 2014-093113

(51) Int. Cl.
| A43B 13/02 | (2006.01) |
| A43B 13/12 | (2006.01) |
| A43B 13/38 | (2006.01) |
| A43B 17/00 | (2006.01) |
| A43B 13/22 | (2006.01) |
| A43B 13/26 | (2006.01) |
| A43B 5/02 | (2006.01) |
| B29D 35/14 | (2010.01) |

(Continued)

(52) U.S. Cl.
CPC .............. *A43B 13/122* (2013.01); *A43B 5/02* (2013.01); *A43B 13/026* (2013.01); *A43B 13/04* (2013.01); *A43B 13/12* (2013.01); *A43B 13/223* (2013.01); *A43B 13/26* (2013.01); *A43B 13/386* (2013.01); *A43B 17/006* (2013.01); *A43C 15/16* (2013.01); *B29D 35/142* (2013.01)

(58) Field of Classification Search
CPC ..... A43B 13/02; A43B 13/023; A43B 13/026; A43B 13/38; A43B 13/386; A43B 17/006
USPC ................................. 36/44, 30 R, 134, 67 R
See application file for complete search history.

(56) References Cited

U.S. PATENT DOCUMENTS 4,654,984 A * 4/1987 Brown ................... A43B 17/14
                                                     36/44
5,204,173 A * 4/1993 Canary .................. A43B 13/38
                                                    428/218

(Continued)

FOREIGN PATENT DOCUMENTS

JP            08000303        1/1996

*Primary Examiner* — Marie Bays
(74) *Attorney, Agent, or Firm* — K. David Crokett, Esq.; Paul J. Backofen, Esq.; Crockett & Crockett, PC

(57) ABSTRACT

An object of the present invention is to provide a novel shoe sole including a specific layered sheet, an insole of a shoe, an out sole of a shoe, and a shoe including the shoe sole. The object can be fulfilled by a shoe sole formed of a layered sheet of a plurality of cloths wherein; the cloths formed of a strand of an oriented thermoplastic resin; and the plurality of cloths are integrated by heating and compressing.

11 Claims, 13 Drawing Sheets

(51) Int. Cl.
*A43B 13/04* (2006.01)
*A43C 15/16* (2006.01)

(56) References Cited

U.S. PATENT DOCUMENTS

| | | | | |
|---|---|---|---|---|
| 5,390,430 | A * | 2/1995 | Fitchmun | B32B 27/12 36/30 R |
| 5,406,723 | A * | 4/1995 | Okajima | A43B 5/049 36/131 |
| 5,836,094 | A * | 11/1998 | Figel | A43B 3/0073 36/131 |
| 5,896,680 | A * | 4/1999 | Kim | A43B 13/187 36/28 |
| 5,918,338 | A * | 7/1999 | Wong | A43B 5/049 12/146 B |
| 7,107,703 | B1 * | 9/2006 | Wang | A43B 1/04 12/146 B |
| 7,825,048 | B2 * | 11/2010 | Wang | A43B 7/32 442/135 |
| 7,832,117 | B2 * | 11/2010 | Auger | A43B 13/026 36/103 |
| 8,082,685 | B2 * | 12/2011 | Sartor | A43B 7/32 36/102 |
| 8,176,659 | B2 * | 5/2012 | von Blucher | A43B 1/00 36/113 |
| 9,775,401 | B2 * | 10/2017 | Cross | A43B 13/02 |
| 2002/0011011 | A1 * | 1/2002 | Vaz | A43B 3/0026 36/73 |
| 2004/0154192 | A1 * | 8/2004 | Bengtsson | A43B 7/1415 36/30 R |
| 2005/0132614 | A1 * | 6/2005 | Brennan | A43B 13/026 36/73 |
| 2008/0282581 | A1 * | 11/2008 | Sartor | A43B 7/32 36/25 R |
| 2009/0019727 | A1 * | 1/2009 | Fenzi | A43B 7/32 36/44 |
| 2009/0235558 | A1 * | 9/2009 | Auger | A43C 15/162 36/30 R |
| 2014/0115929 | A1 * | 5/2014 | Svensson | A43B 5/0486 36/117.3 |
| 2014/0305004 | A1 * | 10/2014 | O'Dowd | A43B 7/32 36/44 |
| 2015/0000053 | A1 * | 1/2015 | Auger | A43B 13/026 12/142 R |
| 2015/0351490 | A1 * | 12/2015 | Lam | A43B 7/32 36/108 |
| 2016/0206039 | A1 * | 7/2016 | Cross | A43B 13/02 |
| 2016/0295956 | A1 * | 10/2016 | Wang | A43B 7/32 |

* cited by examiner

SHOE SOLE, INSOLE OF SHOE, MAIN SOLE OF SHOE, AND SHOE

FIELD OF THE INVENTIONS

The present invention relates to a shoe sole, an insole of a shoe, an out sole of a shoe, and a shoe, and more particularly to a novel shoe sole formed of an integrated layered sheet formed by heating and compressing a layered sheet, an insole of a shoe, an out sole of a shoe, and a shoe.

BACKGROUND OF THE INVENTIONS

Shoe soles are designed to be flexible in the front foot (toe) portion so as to readily bend as toes are bent, while such shoe soles are rigid enough to support the foot sole from the middle foot (arch) portion to the rear foot (heel) portion.

One typical conventional shoe insole is designed to conform to the foot sole, including a front foot portion formed of a relatively soft material, and middle foot and rear foot portions, each formed of a relatively hard material.

PRIOR ART DOCUMENTS

Patent Document 1 discloses the use of pulp boards that constitute insoles in sports shoes.

Patent Document 1: JP-A-H8-303

SUMMARY OF THE INVENTION

Problem to be Solved by the Invention

Inventors of the present invention have intensively studied the impact of shoe soles on the physical performance of shoes wearers while walking or running, and particularly on their agility. As a result, they have found out a variety of significant effects of the use of specific layered sheets in shoe soles, which have not been achieved in conventional insoles heretofore. One such shoe sole is suited particularly for stadium sports such as soccer, rugby, baseball and athletics, and daily exercises such as running and walking. Based on that information, the present invention was accomplished.

It is an object of the present invention to provide a novel shoe sole formed of a specific layered sheet, an insole of a shoe, an out sole of a shoe, and a shoe including the shoe sole.

Other problems with the present invention will be revealed by the following descriptions.

Means for Solving Problem

The problem is solved by following aspects of invention.
1. A shoe sole formed of a layered sheet of a plurality of cloths wherein; the cloths formed of a strand of an oriented thermoplastic resin; and the plurality of cloths are integrated by heating and compressing.
2. The shoe sole according to 1, wherein the strand contains a low-melting point resin component whose melting point is the same as or lower than the heating temperature and a high-melting point resin component whose melting point is higher than the heating temperature.
3. The shoe sole according to 1 or 2, wherein the low-melting point resin component and the high-melting point resin component are the same type of resin component.
4. The shoe sole according to any one of 1 to 3, wherein the integrated layered sheet is formed by disposing an adhesive film between a plurality of the cloths and melting part or all of the adhesive film.
5. The shoe sole according to any one of 1 to 4, wherein either or both surfaces of the layered sheet are laminated with a non-woven fabric or crepe paper, or are subjected to surface roughening treatment.
6. The shoe sole according to any one of 1 to 5, wherein a rib is formed in either or both of the longitudinal direction and the width direction.
7. The shoe sole according to any one of 1 to 6, wherein the number of the cloths layered is made partially different.
8. The shoe sole according to any one of 1 to 7, wherein the cloths are woven from the strand composed of a warp and a weft, and the number of stitches of the strand is made partially different in the cloths.
9. An insole of a shoe, comprising the shoe sole according to any one of 1 to 8.
10. An out sole of a shoe, comprising the shoe sole according to any one of 1 to 8.
11. The out sole of a shoe according to 10, wherein a spike protrudes on the layered sheet.
12. The out sole of a shoe according to 11, wherein the spike is molded so as to protrude on the bottom surface of the layered sheet, and a filler is filled in a recess on an opposing surface of the bottom surface.
13. The out sole of a shoe according to any one of 10 to 12, wherein a counter formed of the layered sheet is integrally formed.
14. A shoe comprising the shoe sole according to any one of 1 to 8.

Effect of the Invention

The present invention can provide a novel shoe sole formed of a specific layered sheet, an insole of a shoe, an out sole of a shoe, and a shoe including the shoe sole.

DETAILED DESCRIPTION OF THE INVENTIONS

Preferred embodiments of the present invention will be described with reference to the drawings.

A shoe sole according to the present invention can be used as a component of a shoe. The component can be placed under the foot sole of a shoes wearer walking or running on the ground, including an insole of the shoe and an out sole of the shoe. Hereinafter, as a shoe sole 1 is described, its description applies to an insole 1A and an out sole 1B unless otherwise specified.

First Embodiment of Shoe Sole

Figure 1:
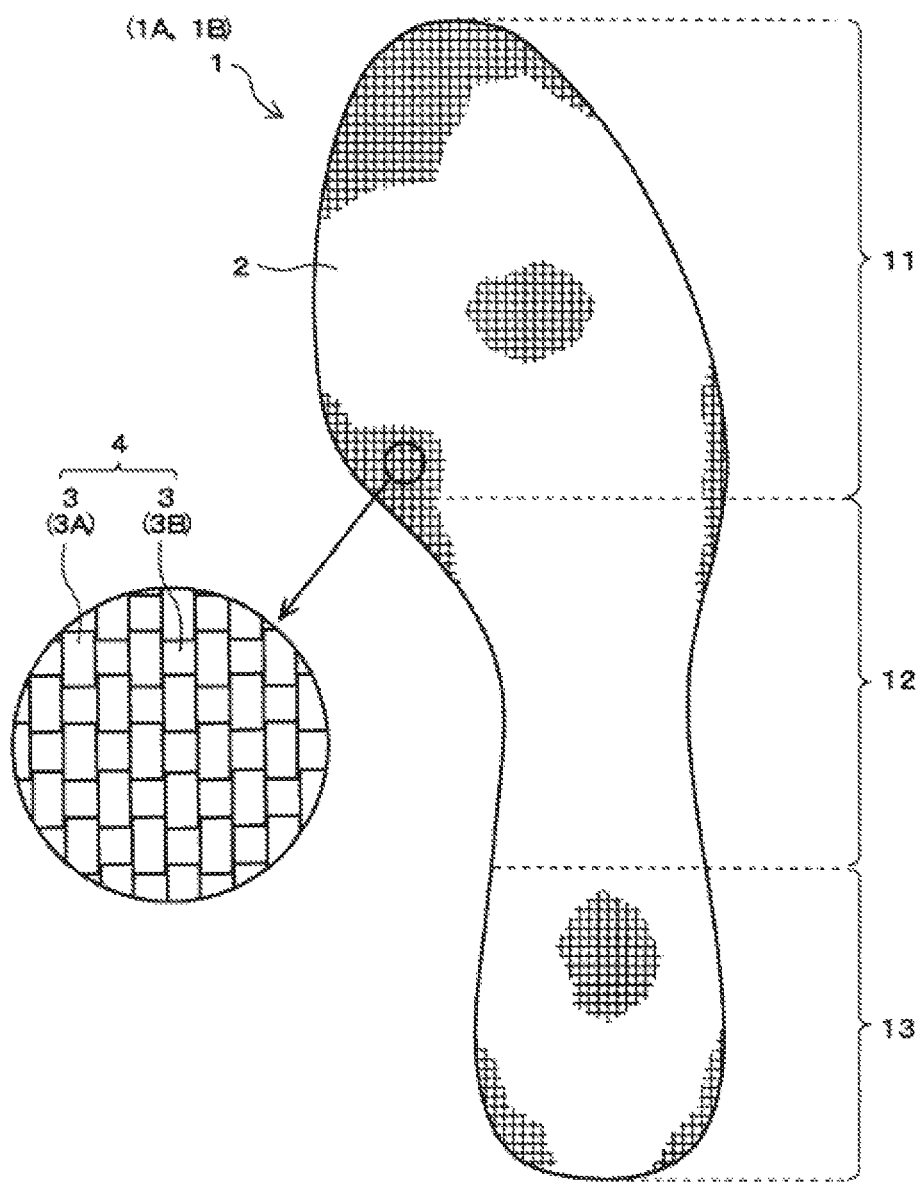
FIG. 1 is a plan view showing a first embodiment of a shoe sole according to the present invention.

FIG. 1 is a plan view showing a first embodiment of the shoe sole according to the present invention. In the figure, a big circle is an enlarged view of a small circle.

The first embodiment illustrates a shoe sole 1 (insole 1A and out sole 1B) formed of a layered sheet 2. In FIG. 1, the numerals 11, 12 and 13 represent a front foot (toe) portion, a middle foot (foot arch) portion and a rear foot (heel) portion, respectively.

The layered sheet 2 is integrally formed by the following steps. The first step is to form a cloth 4 formed of a strand 3 obtained by stretching (orienting, drawing) a thermoplastic resin (step of forming a cloth). In the subsequent second step, a plurality of cloths 4 obtained are layered (step of layering), and the third step is to heat and compress the cloths 4 (step of heating and compressing). The fourth step is to further cool and compress the cloths 4 for integration (step of cooling and compressing).

Any material can be used as the strand 3 so long as it can be formed into a cloth 4, such as tapes, yarns, split yarns, monofilaments and multi-filaments.

Illustrative example of the thermoplastic resin that constitutes the strand 3 includes a resin having a major stretching (orienting) effect, usually a crystalline resin, and specifically, an olefin-based polymer such as high-density polyethylene, low-density polyethylene, polypropylene and an ethylene.propylene block copolymer; polyester such as polyethylene terephthalate and polybutylene terephthalate; and polyamide such as nylon 6 and nylon 66, or the like.

Such an olefin-based polymer as high-density polyethylene, low-density polyethylene and polypropylene is preferably used, particularly in view of processibility, economic efficiency and low specific gravity.

The cloth 4 is a form of layered sheet formed of the strand 3. A cloth 4, as shown in FIG. 1, is usually a form of woven fabric composed of a warp 3A and a weft 3B.

The layered sheet 2 thus formed is cut to a desired size and shape. The cut-out layered sheet, as required, will be curved in the form of a foot sole's surface to form the shoe sole 1.

Figure 2:
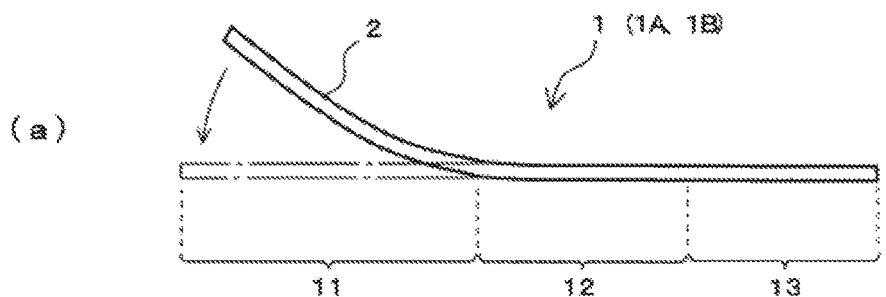
FIG. 2 (*a*) is a side view showing that a front foot portion is bent, and FIG. 2 (*b*) is a side view showing that a portion from middle foot to rear foot portions is bent.
Figure 2:
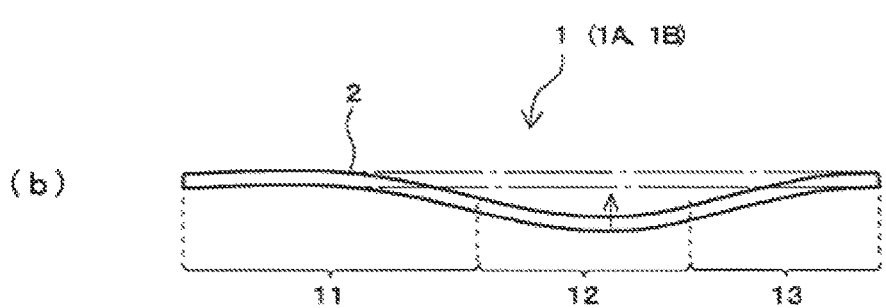

Inventors of the present invention have found that the shoe sole 1 according to the present invention including such a layered sheet 2 has so favorable a bending property as conventional shoe soles. Specifically, as the shoes wearer steps forward to subject toes to dorsal flexion, as shown in FIG. 2 (a), a front foot portion 11 is bent (in solid line) and the layered sheet 2 returns to the original flat position (in one-dot-chain line) with high return elasticity. The shoe sole can subsequently support windlass mechanism of a foot to generate more major thrust.

Figure 3:
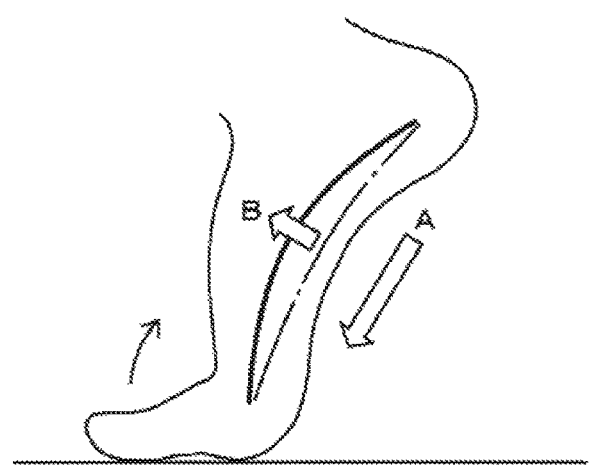
FIG. 3 is a diagram showing the windlass mechanism of a foot.

Windlass mechanism is referred to as the movement of the foot arch as the shoes wearer steps forward. Specifically, as shown in FIG. 3, as the wearer steps forward so as to subject toes to dorsal flexion, the toe's dorsal flexion allows plantar fascia (plantar aponeurosis) formed from the toes to the heel to rise from the heel toward the tip of the toes in the direction A. As a result, the foot arch formed from the root of the toes to the heel is significantly curved and raised from the one-dot-chain line (normal state) to the thick solid line in the direction B. The raised foot arch shows resilience, thereby extending the toes and kicking the ground hard enough to provide thrust for stepping forward. However, the shoes wearer, whose shoes are designed to fix the top of the foot, cannot provide so strong windlass mechanism as walking barefoot.

The conventional shoe soles are formed so as to bend toes as the shoes wearer steps forward, thereby smoothly conforming to toe's dorsal flexion. Consequently, the bending property of the front foot portion is proven to be appropriate, which makes slow the return to the original flat position (low return elasticity). Unfortunately, conventional shoe soles fail to assist windlass mechanism of a foot and thus to sufficiently convey kicking forces for the return to the original flat position after toe's dorsal flexion. The shoe sole 1 according to the present invention, however, can be bent by smoothly conforming to toe's dorsal flexion as the wearer steps forward as well conventional shoe soles, with favorably high return elasticity from the bending position. Accordingly, the toes under dorsal flexion, as the foot arch raised by windlass mechanism returns to the original flat position, tries to extend to the original position, which is promoted by the high return elasticity of the shoe sole 1. This assistance can swiftly and assuredly put the toes to the original position, thus producing a significant effect of providing powerful kicking forces and major thrust.

Further, inventors of the present invention have found that the shoe sole 1, including such a layered sheet 2, as shown in FIG. 2 (b), has high resilience from flexure up to the ground ranging from a middle foot portion 12 to a rear foot portion 13 (in solid line) to the original flat position (in one-dot-chain line) when a shoes wearer lands or treads on the ground with the entire sole.

The conventional shoe soles are weak in resilience from flexure up to the ground to the original flat position due to its soft structure (low resilience). However, the shoe sole 1 has a novel effect of high resilience from flexure when the shoes wearer lands on the ground due to high return elasticity, which has not conventionally been achieved. In other words, the shoe sole 1 is provided with a significant effect of agile action until the next action after landing on the ground due to high resilience from flexure when landing on the ground or treading with the entire sole. Accordingly, the shoe sole 1 according to the present invention can improve the agility, particularly in athletics, upon starting, which is an essential property.

The shoe sole in motion receives forces not only in the foot's length direction, but also in the foot's width direction (torsion). Since the shoe sole 1 according to the present invention can show high return elasticity and resilience against torsion in the foot's width direction, major thrust and high agility can be given not only in the foot's travel direction but also in the foot's lateral direction.

In addition, the layered sheet 2, formed only of a thermoplastic resin, is thus of low specific gravity and lightweight, with high mechanical strength. Therefore, the shoe sole 1 can be formed more thinly so as to have favorable lightweight and bending properties than conventional shoe soles with the same level of basic required rigidity. Accordingly, the shoe sole 1 according to the present invention, if thinned, can provide a significant effect of feeling the sense of unity with the foot of the shoes wearer, the sense of the ground on the foot sole and a good feeling of wear.

In sports using feet such as soccer, in particular, the sense of the ground or ball through the players' shoes is somewhat required, which is difficult to obtain in conventional shoe soles. However, the shoe sole 1 according to the present invention can provide a significant effect of feeling the sense of unity with the shape of a sole and excellence in sense of the ground on the foot sole as well.

In addition, since the shoe sole 1 according to the present invention includes the layered sheet 2 containing a strand obtained by stretching a thermoplastic resin, the shoe sole 1 has high durability, particularly few cracks, less folding and excellence in repeated bending.

As shown in the following second, third and fourth embodiments, the shoe sole 1 can be improved in rigidity partially and readily as well.

When the shoe sole 1 is used as an insole 1A, either or both surfaces thereof may be laminated with a non-woven fabric or crepe paper to provide favorable adhesion with other shoe part. An alternative to a non-woven fabric or crepe paper may be surface roughening treatment such as polishing.

Second Embodiment of Shoe Sole

Figure 4:
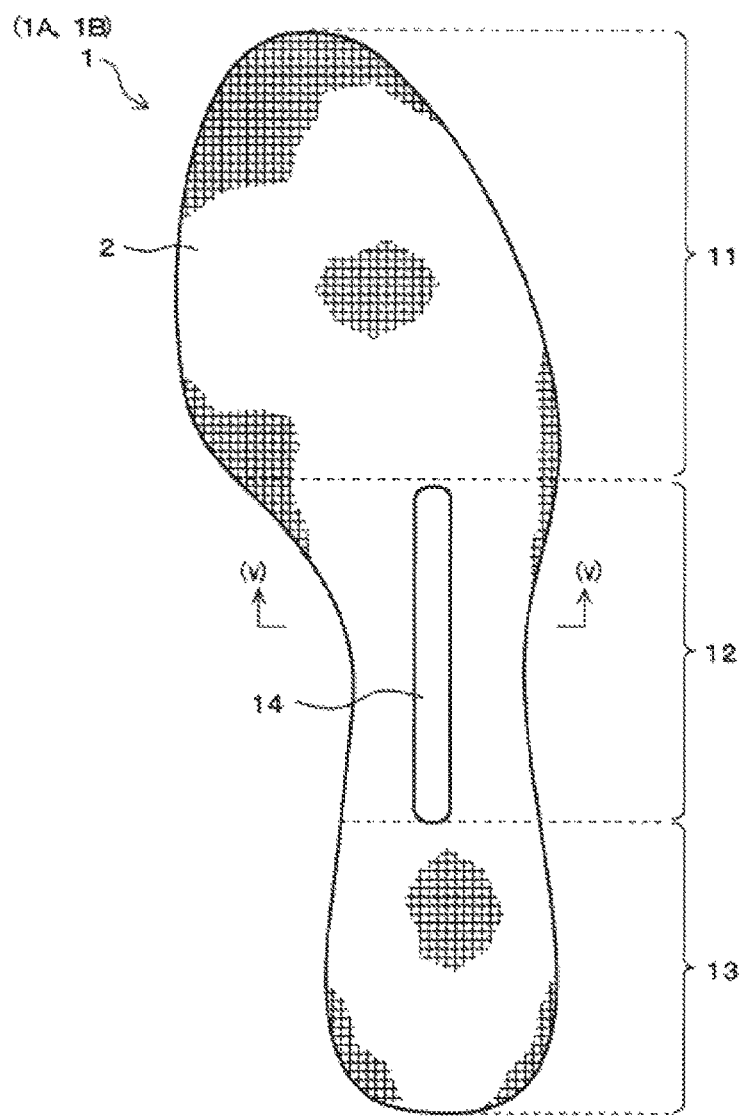
FIG. 4 is a plan view showing one example of a second embodiment of the shoe sole according to the present invention.
Figure 5:
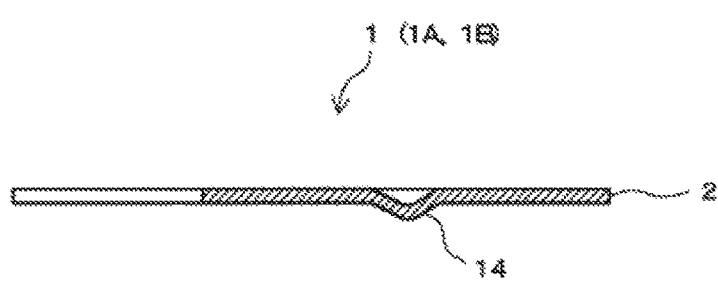
FIG. 5 is a cross-sectional view taken along the line (V)-(V) of FIG. 4.

FIG. 4 is a plan view showing a second embodiment of the shoe sole according to the present invention, and FIG. 5 is a cross-sectional view taken along the line (V)-(V) of FIG. 4. The parts in FIG. 4, except those having the same reference numerals as in FIG. 1, will be described in detail.

The second embodiment illustrates a shoe sole 1 (insole 1A and out sole 1B) having a rib 14. The rib 14 is disposed in a middle foot portion 12 so as to extend in the length direction of the shoe sole 1 (in the vertical direction in FIG. 3). According to the second embodiment, not only the effect in the first embodiment, but also an effect of partially improving the rigidity of the shoe sole 1 by the rib 14 can be provided.

The rib 14 is formed by press molding a layered sheet 2. A cross section of the rib 14, as shown in FIG. 5, may be formed so as to protrude in the form of a substantial triangle, hemisphere, trapezoid, or rectangle on one surface of the shoe sole 1. A plane of the rib 14 can be formed not only so as to have the same width in the length direction, but also to laterally extend, e.g., from a rear foot portion 13 to a front foot portion 11. In addition, the rib 14 can be formed not only so as to linearly extend, but also to be slightly curved in a plan view. Moreover, the height of the rib can be changed as required.

The rib 14 may formed so as to protrude into either an upper surface or a lower surface of the shoe sole 1. When the shoe sole 1 is particularly used as an insole 1A, as shown in FIG. 5, the rib 14 can be formed so that a protruding surface is defined as a lower surface (a surface opposite a surface on which a foot sole rests), thereby giving the shoes wearer no uncomfortable feeling of foot sole.

Figure 6:
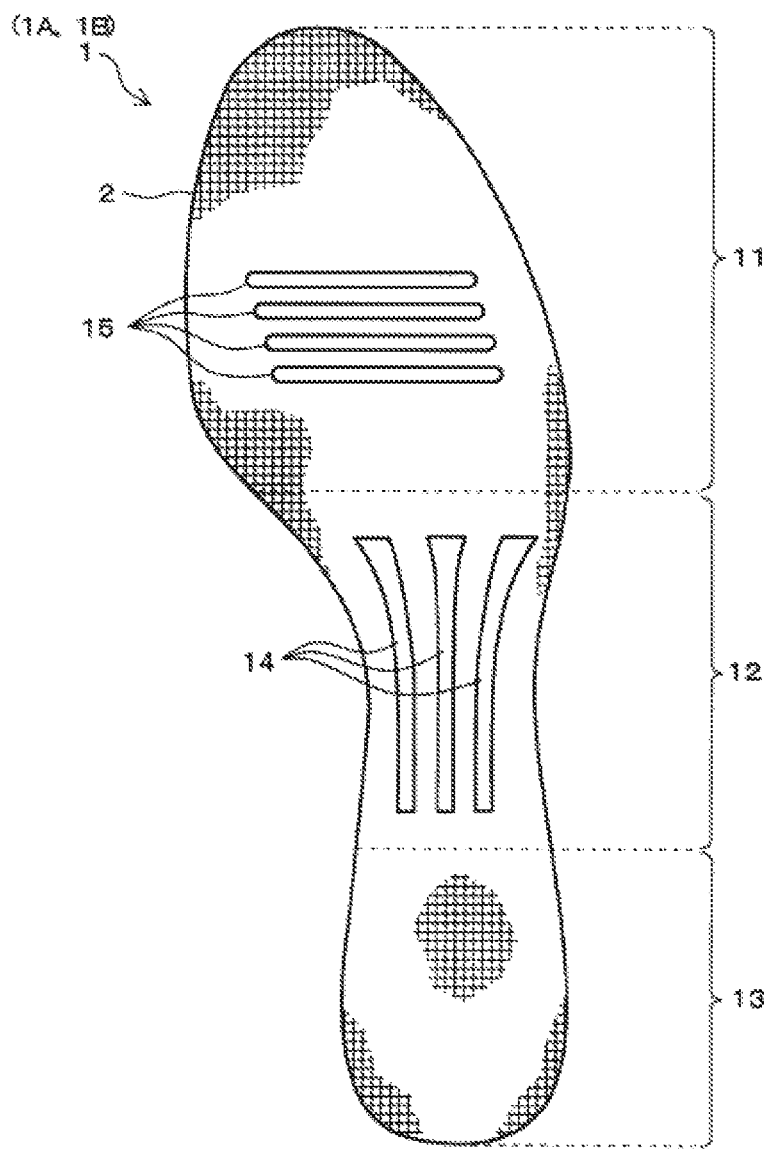
FIG. 6 is a plan view showing alternative example of the second embodiment of the shoe sole according to the present invention.

A plurality of ribs 14 may be disposed. The shoe sole 1 shown in FIG. 6 illustrates 3 ribs 14 placed side by side in the middle foot portion 12. A plurality of ribs 14 (not shown) may intersect in an X-shape in a plan view.

By disposing a plurality of ribs 14 according to desired number, shape and protruding height, the middle foot portion 12 of the shoe sole 1 can be provided with desired rigidity to readily form the shoe sole 1 having characteristics in compliance with wearer's preferences.

In the shoe sole 1 shown in FIG. 6, the front foot portion 11 is also provided with ribs 15. A plurality of the ribs 15, which have been press molded as in the ribs 14, are placed side by side at a predetermined interval in the width direction of the front foot portion 11. The ribs 15 regulate the bending site for bending the front foot portion 11 as the shoes wearer steps forward to subject toes to dorsal flexion, thus smoothly guiding the bending motion of the shoe sole 1. Extending in the width direction, the ribs 15 can improve the rigidity in the width direction of the front foot portion 11. Accordingly, the torsion in the width direction of the front foot portion 11 can be reduced, with an effect of further stabilizing motion of feet as the shoes wearer walks or runs.

The ribs 15, as well as the ribs 14, can be formed in various shapes according to the size and required rigidity of the shoe sole 1, which are not restricted to the example shown, regardless of the number and shape. A plurality of ribs 15 are not necessarily formed in parallel. The ribs 15 may be formed so as to be oriented at an angle relative to the width direction of the out sole 1B.

The ribs 14 formed in the middle foot portion 12 may extend to the rear foot portion 13.

Third Embodiment of Shoe Sole

Figure 7:
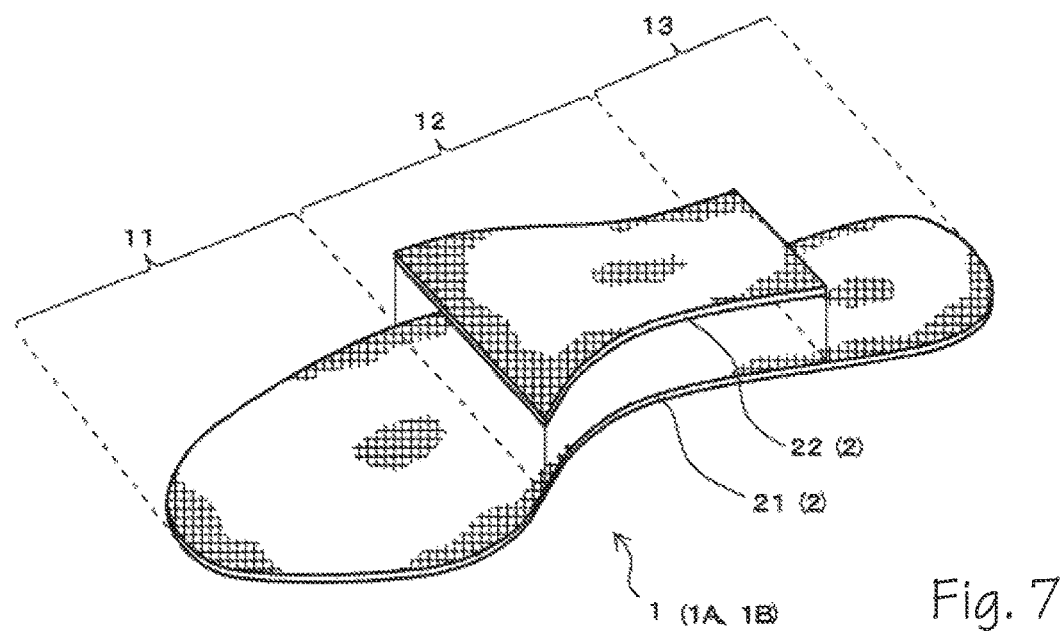
FIG. 7 is an exploded perspective view showing one example of a third embodiment of the shoe sole according to the present invention.
Figure 8:
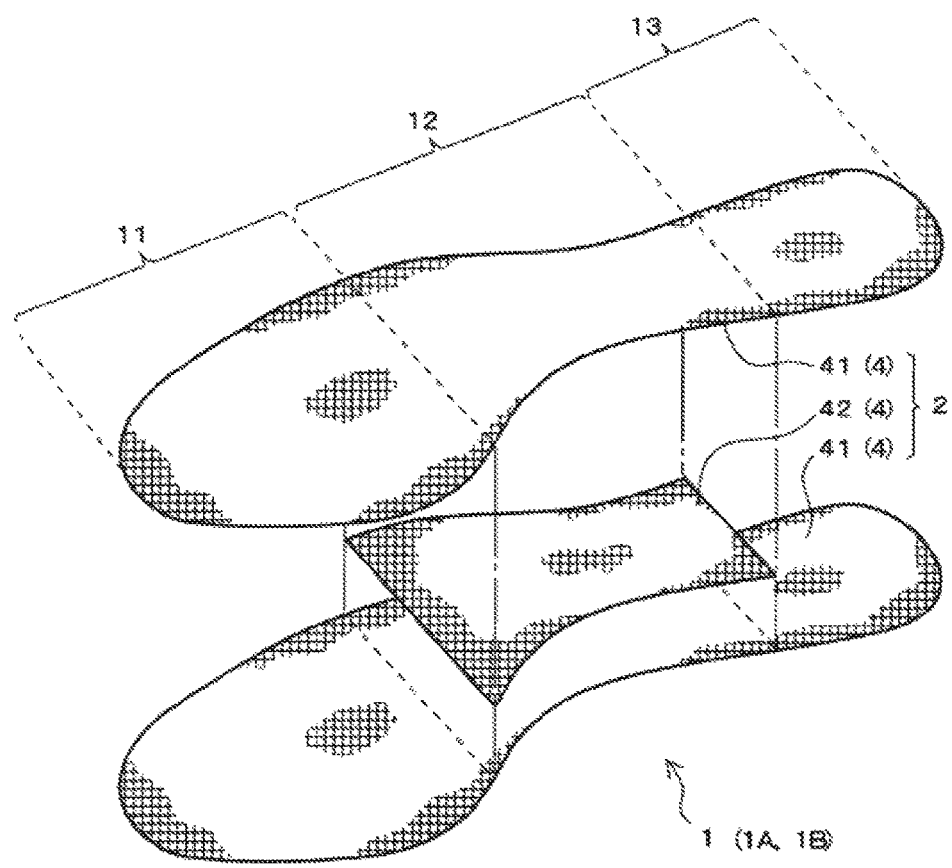
FIG. 8 is an exploded perspective view showing an alternative example of the third embodiment of the shoe sole according to the present invention.

FIGS. 7 and 8 are exploded perspective views of a third embodiment of the shoe sole according to the present invention. The parts in FIGS. 7 and 8, except those having the same reference numerals as in FIG. 1, will be described in detail.

The third embodiment illustrates a shoe sole 1 (insole 1A and out sole 1B) whose rigidity is partially improved by making partially different the number of cloths 4 that constitute a layered sheet 2. In the third embodiment as well, not only the effect in the first embodiment, but also an effect of partially improving the rigidity of the shoe sole 1 can be provided.

FIG. 7 shows a shoe sole 1 including a small layered sheet 22, which is smaller than a large layered sheet 21, provided only at a portion corresponding to a middle foot portion 12 of the large layered sheet 21 which integrally forms a front foot portion 11, a middle foot portion 12 and a rear foot portion 13. Both the large layered sheet 21 and the small layered sheet 22 are a layered sheet 2 formed by layering a plurality of cloths 4 and heating and compressing the cloths 4. Accordingly, the number of the cloths 4 layered in the shoe sole 1 is partially large in the middle foot portion 12 in which the large layered sheet 21 and the small layered sheet 22 are layered, thereby partially improving the rigidity of the middle foot portion 12.

The large layered sheet 21 and the small layered sheet 22 may be integrated by layering the same as a separate layered sheet 2 and heating and compressing the layered sheets 2 again, or integrated by separately forming the same as a layered sheet 2 and bonding the layered sheets 2 with an adhesive.

Meanwhile, FIG. 8 shows a shoe sole 1 including a layered sheet 2 formed by layering partially large number of cloths 4 layered therein. Herein, one small cloth 42, which is smaller than a large cloth 41, is sandwiched between a portion corresponding to a middle foot portion 12 in 2 large cloths 41,41. On the other hand, the small cloth 42 may be disposed on a surface of the layered sheet 2.

In each of the large cloths 4, the front foot portion 11, the middle foot portion 12 and a rear foot portion 13 are integrally formed, and the small cloth 42 is formed only at a portion corresponding to the middle foot portion 12 in the shoe sole 1. After layering the large cloth 41 and the small cloth 42, the layered sheet 2 is formed by heating and compressing the cloths. Advantageously, the number of the cloths 4 layered in the shoe sole 1 is partially large in the middle foot portion 12, thereby partially improving the rigidity of the middle foot portion 12.

Referring to FIGS. 7 and 8, the small layered sheet 22 and the small cloth 42 are formed according to the shape of the middle foot portion 12, but such formation pattern is not restricted thereto. Such an optional shape as a rectangle may be allowed.

The rigidity of any portion, other than the middle foot portion 12 as required, can partially be improved by the above-mentioned method.

Fourth Embodiment of Shoe Sole

Figure 9:
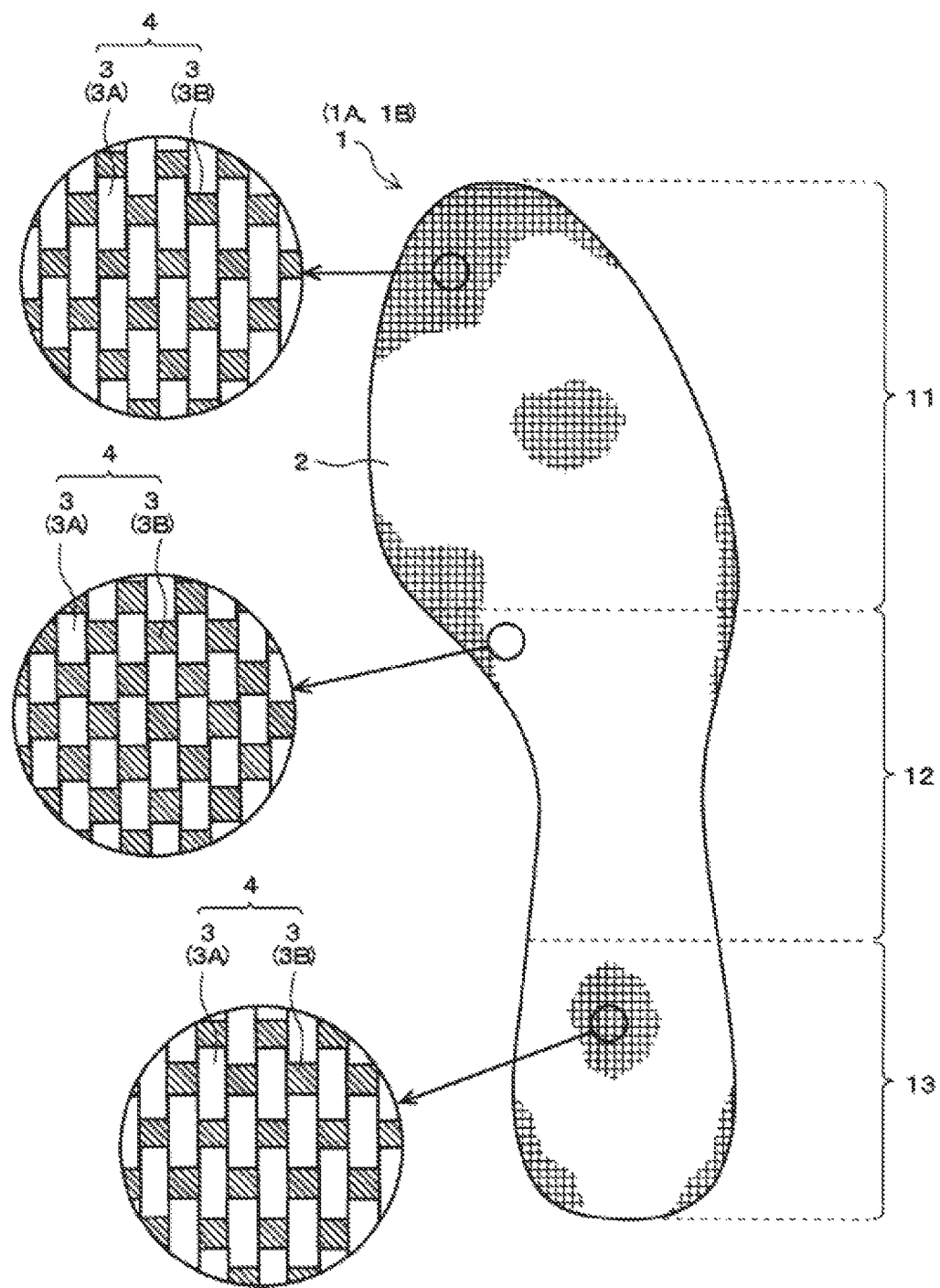
FIG. 9 is a plan view showing a fourth embodiment of the shoe sole according to the present invention.

FIG. 9 is a plan view showing a fourth embodiment of the shoe sole according to the present invention. In the figure, a big circle is an enlarged view of a small circle. The parts in FIG. 9, except those having the same reference numerals as in FIG. 1, will be described in detail.

The fourth embodiment illustrates a shoe sole 1 (insole 1A and out sole 1B) obtained by partially improving the rigidity of the shoe sole 1 by using a layered sheet 2 in which the number of stitches of a strand 3 of a cloth 4 is made partially different in the cloth 4. The fourth embodiment can provide not only the effect in the first embodiment, but also an effect of partially improving the rigidity of the shoe sole 1.

The shoe sole 1 comprises a middle foot portion 12 and a front foot portion 11. In the shoe sole 1, the number of stitches of a warp 3A of a strand 3 of a cloth 4 of the middle foot portion 12, with each strand being composed of a warp 3A and a weft 3B, is made larger than the number of stitches of a warp 3A of a strand 3 of a cloth 4 of the front foot portion 11. With a larger number of stitches of a strand 3, a cloth 4 shows higher strength to improve the rigidity of the shoe sole 1. Accordingly, the shoe sole 1 can partially improve the rigidity of the middle foot portion 12.

The cloths 4 obtained by making different the number of stitches of a strand 3 may be part or all of a plurality of cloths 4 that constitute the layered sheet 2.

The specific number of stitches can be adjusted according to the thickness of the strand 3 or required rigidity of the shoe sole 1.

The number of stitches of a strand 3 can be adjusted not only in the middle foot portion 12, but also, as required, in any portion.

The rigidity of the shoe sole 1 may partially be improved by combining two or more of the above second embodiment, third embodiment and fourth embodiment accordingly.

Fifth Embodiment of Shoe Sole

Figure 10:
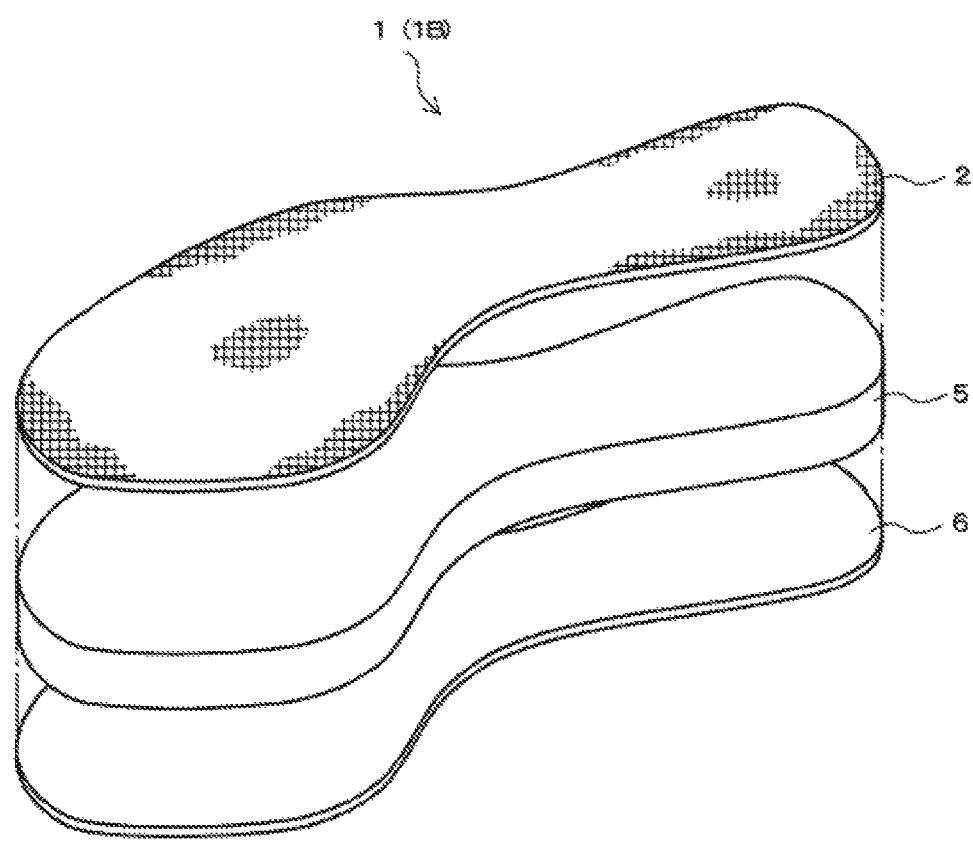
FIG. 10 is a plan view showing a fifth embodiment of the shoe sole according to the present invention.

FIG. 10 is an exploded perspective view showing a fifth embodiment of the shoe sole according to the present invention. The parts in FIG. 10, except those having the same reference numerals as in FIG. 1, will be described in detail.

The shoe sole 1 shown in the first to fourth embodiments illustrates one example of the use both as the insole 1A and the out sole 1B. The shoe sole 1 of the fifth embodiment illustrates one example of the use as the out sole 1B.

The out sole 1B comprises a layering structure obtained by layering a plurality of layers including a layered sheet 2. The out sole 1B comprises 3 layers: the layered sheet 2, a mid layer 5 and an out layer 6. The layered sheet 2 may be any one shown in the above-mentioned first to fourth embodiments.

The mid layer 5 is formed, for instance, of a foamed synthetic resin such as ethylene vinyl acetate (EVA), polyethylene (PE), polypropylene (PP) and polyurethane (PU). The out layer 6 is formed, for instance, of a material having abrasion resistance and slip resistance such as rubber.

The layered sheet 2, the mid layer 5 and the out layer 6 are integrally bonded with an adhesive to form the outsole 1B. Also, an out sole 1B may be formed by integrally melting and attaching the same by heating. Moreover, an out sole 1B may be formed by sequentially injection molding a layer of a mid layer 5 and a layer of an out layer 6 on a layered sheet 2 integrally.

The out sole 1B is provided not only with the effect in the first embodiment, but also with an effect of suitable use as an out sole in running shoes and walking shoes by virtue of favorable cushioning provided by the mid layer 5.

Herein, a 3-layer layering structure is illustrated, but the number of layers is not specifically restricted. The out sole 1B may be formed, not only layering the layered sheet 2 as an uppermost layer, but also layering the layered sheet 2 as an intermediate layer. Moreover, two or more layered sheets 2 may be used, out of a plurality of layers that constitute the layering structure.

Sixth Embodiment of Shoe Sole

Figure 11:
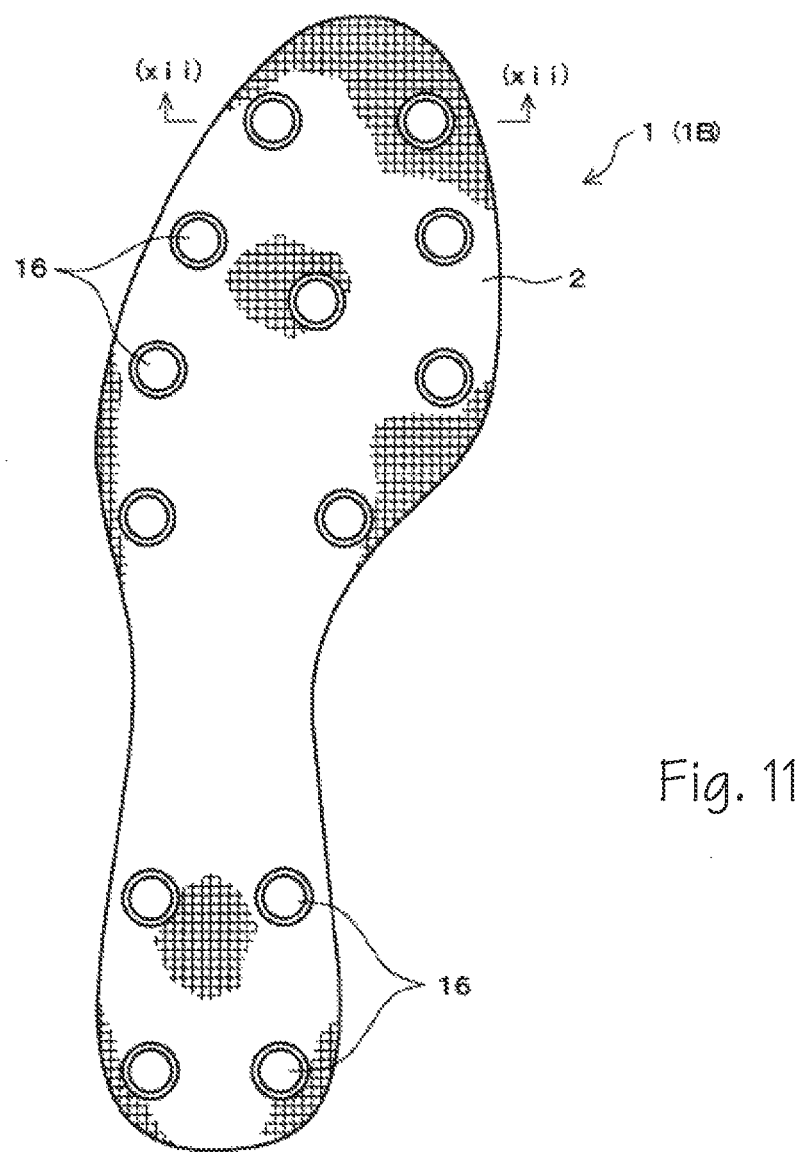
FIG. 11 is a plan view showing a sixth embodiment of the shoe sole according to the present invention.
Figure 12:
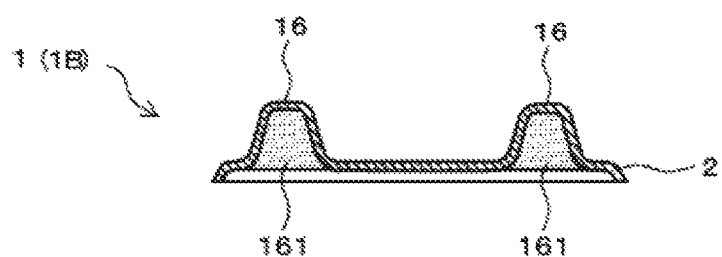
FIG. 12 is a cross-sectional view taken along the line (xii)-(xii) of FIG. 11.

FIG. 11 is a bottom view showing a sixth embodiment of the shoe sole according to the present invention. FIG. 12 is a cross-sectional view taken along the line (xii)-(xii) of FIG. 11. The parts in FIG. 11, except those having the same reference numerals as in FIG. 1, will be described in detail.

The shoe sole 1 of the sixth embodiment illustrates one example of the use as an out sole 1B.

In the out sole 1B shown in this embodiment, a suitable number of spikes 16 protrude into the bottom surface of a layered sheet 2 (a surface contacting with the ground). The out sole 1B can provide not only the effect in the first embodiment, but also an effect of suitable use as an out sole in sports shoes for stadium sports such as soccer and rugby.

The spikes 16, as shown in FIG. 12, are formed by press molding a layered sheet 2 so as to integrally protrude, for instance to be partially convex on the bottom surface and concave (making a recess) on its opposing surface. The shape of the spikes 16 may be optional and is not restricted to the shape shown in the drawing.

A filler 161 is preferably filled in the recess on an opposing surface of the bottom surface. Accordingly, the use of the filler 161 can maintain functions of the spikes 16 even in cases where the tip thereof is prone to a hole due to long-time abrasion or other problems. The filler 161 is preferably formed of a material serving as cushioning and having appropriate elasticity, such as rubber. A rubber material can also provide an effect of reducing thrust upon contact with the ground.

In addition, a spike 16 can be formed by injection molding a synthetic resin such as polyamide and polyurethane as a post-treatment on the bottom surface of a layered sheet 2 for forming an out sole 1B (not shown). Preferably, in order to favorably integrate the injection molded synthetic resin and the layered sheet 2, a synthetic resin having good adhesion with both the injection molded synthetic resin and the layered sheet 2 is layered in the form of a film or coating at least on the bottom surface of the layered sheet 2.

Further, a spike 16 may be screwed on the bottom surface of the out sole 1B (not shown). The spike 16 can removably be mounted to the out sole 1B, which is provided with female screws hole and nuts, by screwing screw shafts that each protrude from the spike 16.

The out sole 1B shown in the sixth embodiment may be formed by combining two or more of the above second embodiment, third embodiment and fourth embodiment accordingly.

Seventh Embodiment of Shoe Sole

Figure 13:
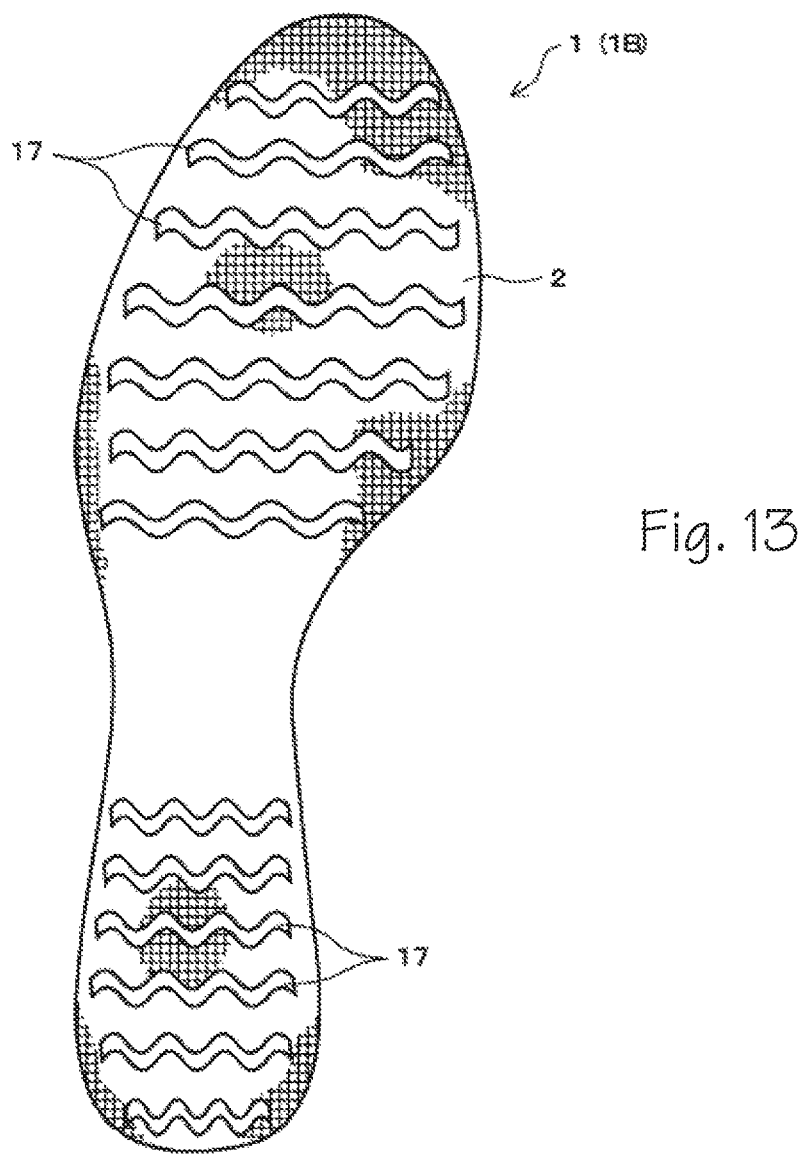
FIG. 13 is a plan view showing a seventh embodiment of the shoe sole according to the present invention.

FIG. 13 is a bottom view showing a seventh embodiment of the shoe sole according to the present invention. The parts in FIG. 13, except those having the same reference numerals as in FIG. 1, will be described in detail.

The shoe sole 1 of the seventh embodiment also illustrates one example of the use as an out sole 1B.

In the out sole 1B shown in this embodiment, a suitable number of nonslip lugs 17 protrude into the bottom surface of a layered sheet 2 (a surface contacting with the ground). The out sole 1B can provide not only the effect in the first embodiment, but also an effect of suitable use as an out sole in sports shoes for running and walking.

A nonslip lug 17 can be formed by injection molding, for instance, a soft synthetic resin such as polyurethane on the bottom surface of a layered sheet 2. Preferably, as in the spikes 16, a synthetic resin having good adhesion with both the injection molded synthetic resin and the layered sheet 2 is layered in the form of a film or coating at least on the bottom surface of the layered sheet 2. In addition, a nonslip lug 17 additionally formed may be bonded with an adhesive on the bottom surface of the layered sheet 2.

The out sole 1B shown in the seventh embodiment may be formed by combining two or more of the above second embodiment, third embodiment and fourth embodiment accordingly.

Eighth Embodiment of Shoe Sole

Figure 14:
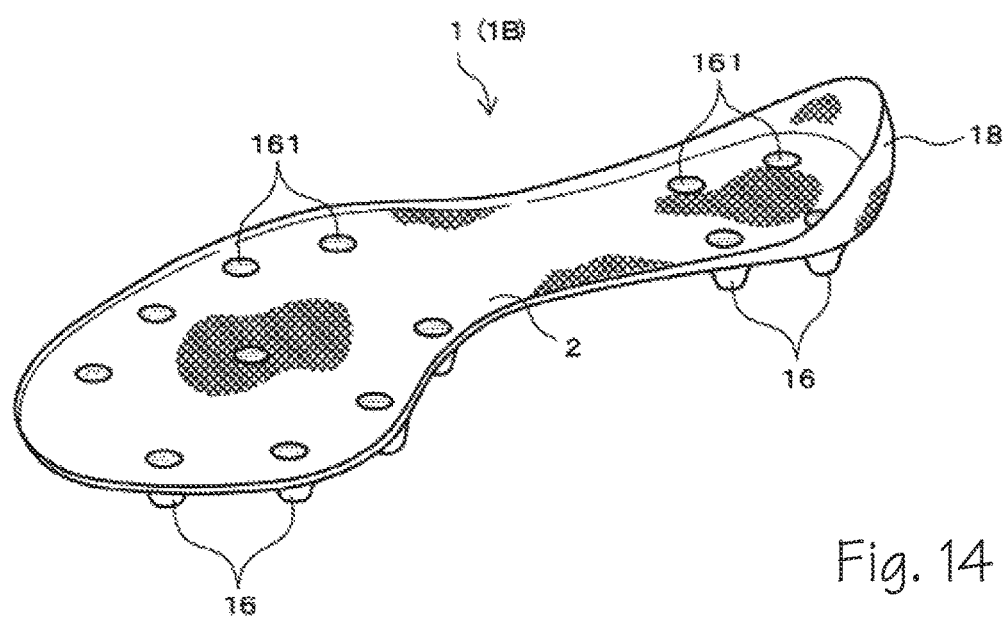
FIG. 14 is a plan view showing an eighth embodiment of the shoe sole according to the present invention.

FIG. 14 is a perspective view showing an eighth embodiment of the shoe sole according to the present invention. The parts in FIG. 14, except those having the same reference numerals as in FIGS. 1, 11 and 12 will be described in detail.

The shoe sole 1 of the eighth embodiment also illustrates one example of the use as an out sole 1B.

In the out sole 1B shown in this embodiment, a counter 18 formed of a layered sheet 2 is integrally formed in a rear foot portion. The counter 18 is a portion formed of a core material, mainly aimed at maintaining the shape of the shoe's heel portion and protecting the heel. The counter 18 shown in this embodiment is integrally formed in the rear foot portion of the out sole 1B by, for instance, press molding the layered sheet 2 forming the out sole 1B.

The out sole 1B can provide not only the effect in the first embodiment, but also an effect of holding the heel by the counter 18 and improving the stability of feet in active sports events.

Specifically, when stepping forward or upon landing on the ground, the heel always moves in a shoe. For instance, when landing on the ground, there found pronation: the heel deforms while slightly tilting inwardly. A usual shoe's counter, formed of a relatively hard synthetic resin solely to maintain the shape of the heel portion of a shoe, is designed to have difficulty in following the movement of the heel in the shoe. Therefore, such a counter has insufficient function of holding the heel while following the movement of the heel and problems with improvement in the stability of a foot in the shoe.

However, the out sole 1B having the counter 18 formed of the layered sheet 2 can readily bend and deform while the counter 18 follows the movement of the heel. In addition, the counter 18 formed of the layered sheet 2, having a high return elasticity as mentioned above, follows the movement of the heel to deform, and thereafter it swiftly returns to the original shape. This resilience is assisted by the high return elasticity of the counter 18. Accordingly, the effect of holding the heel can be improved, as well as the stability of a foot in the shoe.

The heel deformed by pronation when landing on the ground can swiftly return to the original shape by assistance from the return elasticity of the counter 18. Accordingly, the shoes wearer can step forward more swiftly after landing on the ground.

Further, the counter 18, which can readily be deformed by following the movement of the heel, can reduce deformation of a vamp portion, other than the portion of the counter 18, by the movement of the heel. Accordingly, the sense of unity with a vamp can be improved, and the counter 18 can prevent sand or other foreign substances from coming in the shoe through gaps generated by deformation of the vamp. The rigidity of the layered sheet 2 itself can obviously keep the original shape of the heel portion of the shoe.

The out sole 1B having the counter 18 is not restricted to the one having spikes 16.

(Composition of Layered Sheet)

Then, the composition of a layered sheet 2 will specifically be described.

The layered sheet 2 is integrally formed by layering a plurality of cloths 4 formed of a strand 3 obtained by stretching a thermoplastic resin and by heating and compressing the cloths 4.

The strand 3, as mentioned above, may be, for instance, tapes or yarns, and the strand 3 are twisted as requested. Preferably, a flattened strand such as a tape and a yarn, and particularly a flat yarn as a tape strand is used.

Part of a strand 3 is preferably melted to obtain an integrated layered sheet 2 by layering a plurality of cloths 4 and heating and compressing the cloths 4 layered.

Preferably, the strand 3 each contain a low-melting point resin component and a high-melting point resin component. The strand 3 are heated in a temperature range so as to allow a low-melting point resin component to melt and a high-melting point resin component not to melt. Accordingly, the low-melting point resin component and the high-melting point resin component turn into an adhesive component and a reinforced fiber, respectively. The strand contains a low-melting point resin component whose melting point is the same as or lower than the heating temperature and a high-melting point resin component whose melting point is higher than the heating temperature.

Figure 15:
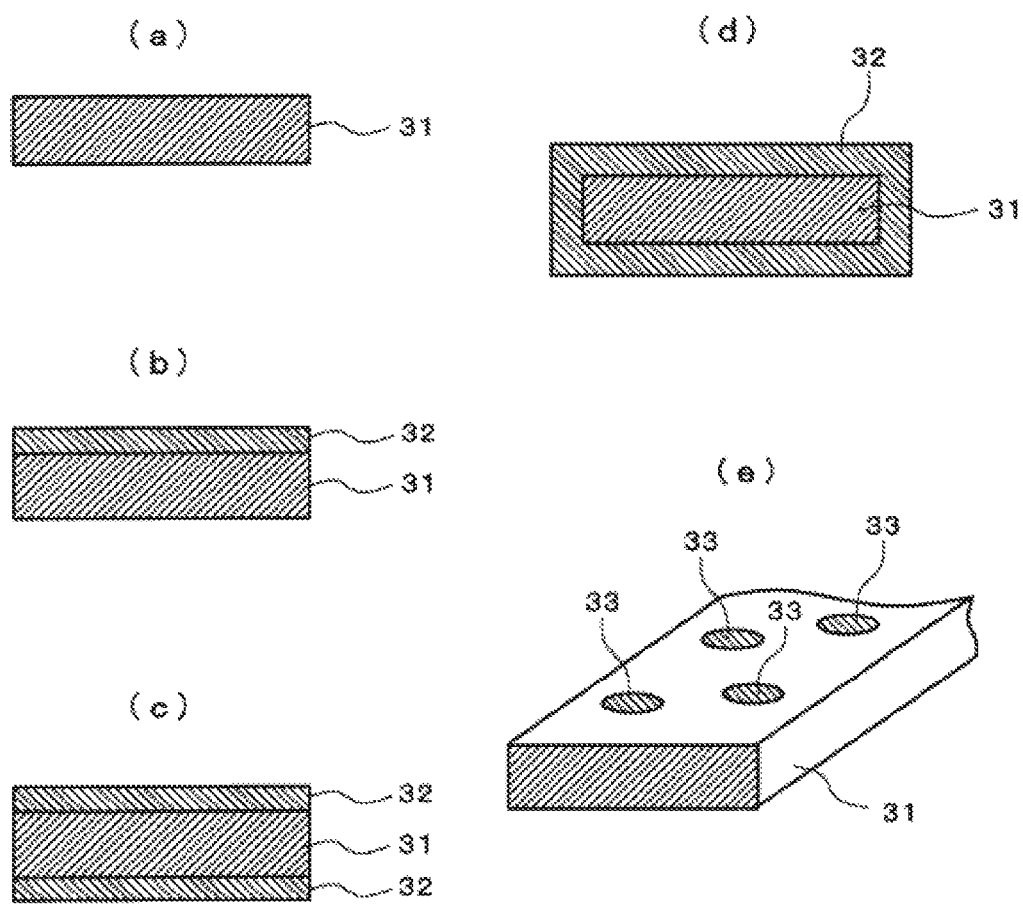
FIGS. 15 (a) to (e) are diagrams showing the structure of a strand.

The low-melting point resin component and the high-melting point resin component may be a low-melting point resin component and a high-melting point resin component which are essentially contained in a resin that constitutes the strand 3, respectively. Further, the strand 3 may be intended to contain a low-melting point resin component portion and a high-melting point resin component portion. In the former case, as shown in FIG. 15 (*a*), the strand 3 can be formed only of a base layer 31 as a single layer. In the latter case, however, as shown in FIGS. 15 (*b*) and (*c*), the strand 3 can be formed of a layering structure in which a surface layer 32 composed of a thermoplastic resin whose melting point is lower than the base layer 31 is layered on either or both surfaces of the base layer 31. Further, in the latter case, as shown in FIG. 15 (*d*), the strand 3 may be formed of a sheath-core structure in which a surface layer 32 composed of a thermoplastic resin whose melting point is lower than the base layer 31 encloses the base layer 31. As shown in FIG. 15 (*e*), the strand 3 may be formed of sea-island structure in which a thermoplastic resin 33 whose melting point is lower than the base layer 31 is dispersed.

Consider that the strand 3 that constitutes the layered sheet 2 include the base layer 31 as a high-melting point resin component, the surface layer 32 as a low-melting point resin component and the thermoplastic resin 33 of sea-island structure. A thermoplastic resin whose melting point is lower than the base layer 31 is used in the surface layer 32 and the thermoplastic resin 33. Preferably, a resin component that constitutes the base layer 31 and resin components of the surface layer 32 and the thermoplastic resin 33 of sea-island structure are the same type of resin component. This is because that when heated and compressed as subsequently described, cloths 4 that constitute a strand 3 can more tightly be bonded to each other. The same type of resin component is referred to as a resin composed of, e.g., polyolefin, polyamide and polyester.

Each type of additive can be added to the strand 3 according to intended purpose, specifically an antioxidant such as organic phosphorus and thioether; a light stabilizer such as hindered amine; an ultraviolet absorber such as benzophenone, benzotriazole and benzoate; an antistatic agent; a dispersant such as bisamide, wax and organometallic salt; lubricant such as amide and organometallic salt; a fire retardant such as bromine-containing organic retardant, phosphoric acid, melamine cyanurate and antimony trioxide; a stretching aid (an orienting aid) such as a low-density polyethylene and a linear low-density polyethylene; an organic pigment; an inorganic pigment; an inorganic filler; an organic filler; an inorganic antibacterial agent such as metal ion; and organic antibacterial agent.

Consider that a layering structure is used as a strand 3. The method for molding a layered film as a molding material can be selected from a known means such as: means for forming a film as a base layer 31 and a film as a surface layer 32 beforehand and layering a plurality of films using dry laminate method or heat laminate method; means for coating a thermoplastic resin as a surface layer 32 on a surface of a film as a base layer 31; means for extrusion laminating a surface layer 32 on a film as a base layer 31 formed beforehand; and means for extrusion molding a layered film by multilayer coextrusion method accordingly. In light of easy molding, cost competitiveness and favorable adhesion between layers in a sheet product, a method for obtaining a layering structure composed of a base layer 31 and a surface layer 32 in the form of a single-stage by multilayer coextrusion method is preferable.

The means for obtaining a strand 3 of an oriented thermoplastic resin can be, for instance, uniaxially stretching (orienting, drawing). In this case, after stretching a film as a base layer 31 in the uniaxial direction, a thermoplastic resin as a surface layer 32 is layered, and may be slitted to be tape-like. As an alternative, before or after a layered film obtained by layering a base layer 31 and a surface layer 32 is slitted, the layered film can be stretched in the uniaxial direction to obtain a strand 3.

The method for stretching films is not specifically restricted, and a film can be stretched in the form of a single- or multi-stage, using a known heating method such as heated roll, hot plate, hot air furnace, hot water, hot oil, steam and infrared radiation.

The thickness of the strand 3 can optionally be selected according to intended purpose, but preferably is in the range of 50 to 10,000 decitex (dt).

Each of the cloths 4 is a sheet formed of a strand 3. As shown in FIGS. 1 and 9, a woven fabric composed of a warp 3A and a weft 3B can usually be used for the cloths 4. As an alternative, Cloths 4 can be a cross-linked cloth, including a great number of strands placed side by side in one direction, and a great number of strands placed thereon side by side so as to intersect in an optional angle direction. Subsequently, the resulting intersection is joined by using an adhesive such as a hot-melt adhesive or by thermal melting and attaching. As an alternative, cloths 4 can be a multiaxial fiber base material, including a great number of strands 3 placed side by side in one direction, and a great number of strands 3 placed thereon side by side so as to intersect in an optional angle direction. Subsequently, such strands 3 can be linked by stitching threads. The cloths 4 may be knitting.

Consider that an integrated layered sheet 2 is obtained by layering a plurality of cloths 4 and heating and compressing the cloths 4. Such an integrated layered sheet 2 can be produced by disposing an adhesive film between these cloths 4 and melting part or all of the adhesive film, preferably by melting part of the adhesive film.

Illustrative preferable example of the adhesive film includes a resin film. The resin film preferably contains a resin component, the same type as a resin that constitutes the strand 3. Illustrative preferable example of the adhesive film includes a low-melting point resin component as a resin to be melted and a high-melting point resin component as a resin not to be melted. For instance, an adhesive film in which micro-particles of a high-melting point resin are dispersed in the low-melting point resin can preferably be used.

Further, consider that an integrated layered sheet 2 is obtained by layering a plurality of cloths 4 and heating and compressing the cloths 4. It is preferable in this case that part of a strand 3 be melted and an adhesive film be disposed between these cloths 4, and part or all of the adhesive film be melted. More preferably, part of the adhesive film is melted.

The layered sheet 2 is integrally formed by layering a plurality of cloths 4 and heating and compressing the cloths 4. The specific method for producing a layered sheet 2 is not specifically restricted, but one such example will be described as follows.

First, cloths 4 are formed of a strand 3 in a step of forming cloths, and then a plurality of cloths 4 obtained are layered in a step of layering. After such cloths 4 are heated and compressed in a step of heating and compressing, the cloths 4 are cooled and compressed in a step of cooling and compressing to form a layered sheet 2 as a material of a desired shoe sole.

In the step of forming cloths, the cloths 4 are formed of the strand 3. When cloths 4 are defined as a woven fabric, the method of weaving is not specifically restricted, but for instance, plain weave, twill weave (Aya-Ori, Syamon-Ori), rib weave and double weave can be used.

In the step of layering, a plurality of cloths 4 thus obtained are layered. The number of the cloths layered is two or more to provide the layered sheet 2 with some mechanical strength. The maximum number of cloths layered can be optionally determined so as to provide the shoe sole 1 (insole and out sole) as a desired product with desired thickness or rigidity.

The cloths 4 to be layered are not always identical. Also, in cloths 4 to be layered, the type, width, thickness, drawing magnification (draw ratio), number of stitches and method of weaving of a strand 3 may be made different. When a small cloth 42 is disposed in between as shown in FIG. 8, a large cloth 41 and the small cloth 42 can be layered in the step of layering.

In the step of heating and compressing, a layered product of a plurality of cloths 4 layered is heated and compressed. In the step of heating and compressing, the cloths 4 may be compressed after heating, or the cloths 4 may be heated and compressed at the same time.

Heating conditions are not specifically restricted so long as an integrated layered sheet 2 can be obtained, but they are preferably determined so that part of a strand 3 is melted. The use of strands 3, shown in FIGS. 15 (*b*) to (*e*), allows a base layer 31 of the strand 3 not to melt. Preferably, the temperature range is determined to melt a portion whose melting point is lower than a base layer 31, such as a surface layer 32 and a thermoplastic resin 33 of sea-island structure. Accordingly, the strand 3 can readily be heated and compressed so that part thereof can melt. By compressing the cloths 4 in the above temperature range, the base layer 31 doesn't melt. However, the surface layer 32 and the thermoplastic resin 33 of sea-island structure has a lower melting point than the base layer 31, thereby melting the surface layer 32 and the thermoplastic resin 33 to tightly bond adjacent cloths 4,4.

Consequently, the layered sheet 2 comprises the cloths 4 formed of the strand 3 including the base layer 31, and the surface layer 32 and the thermoplastic resin 33 of sea-island structure whose melting point are lower than the base layer 31. In the layered sheet 2, the base layer 31 as a high-melting point resin component in the strand 3 acts as a reinforced fiber, and the surface layer 32 and the thermoplastic resin 33 of sea-island structure as a low-melting point resin component acts as an adhesive component. Accordingly, the layered sheet 2 has a high flexural modulus, excellence in impact resistance, in which adjacent cloths 4,4 are tightly bonded.

When the above-mentioned adhesive film is disposed between cloths 4, heating conditions can be determined so that part of the adhesive film melts. Accordingly, adjacent cloths 4,4 can tightly be bonded. When part of the adhesive film melts, adjacent cloths 4,4 can more tightly be bonded by determining heating conditions so that part of the strand 3 melts.

The pressure and duration for compressing vary according to a resin used in the strand 3 that constitutes the cloths 4 and the thickness of the cloths 4. As one example, the pressure is 0.5 MPa to 30 MPa, and the duration for compressing is a few seconds to 20 minutes.

In the step of cooling and compressing, the layered product heated and compressed in the step of heating and compressing is compressed at a decreasing temperature. Herein, the decreasing cooling is lower than the temperature in the step of heating and compressing, for instance, 10 to 60° C. During the step of cooling and compressing, the surface layer 32 and the thermoplastic resin 33 of sea-island structure, which gave melted during the step of heating and compressing, are cured to obtain a layered sheet 2 in which the cloths 4 are each completely cured.

The pressure and duration for compressing vary according to a resin used in a strand 3 that constitutes the cloths 4 and the thickness of the cloths 4. As one example, the pressure is 0.5 MPa to 30 MPa, and the duration for compressing is a few seconds to 20 minutes.

The compressing means used in the step of heating and compressing and the step of cooling and compressing is not specifically restricted, and suitably known devices such as oil hydraulic press, roll press and double belt press can be used.

A layered sheet 2 finally obtained is formed so as to have a desired thickness through the step of cooling and compressing.

The layered sheet 2 thus formed can be cut to a desired size and shape according to intended purpose of the shoe sole 1 (insole 1A and out sole 1B). The cut-out layered sheet, as required, will be curved in the form of a foot sole's surface to form the shoe sole 1.

(Embodiment of Shoe)

Figure 16:
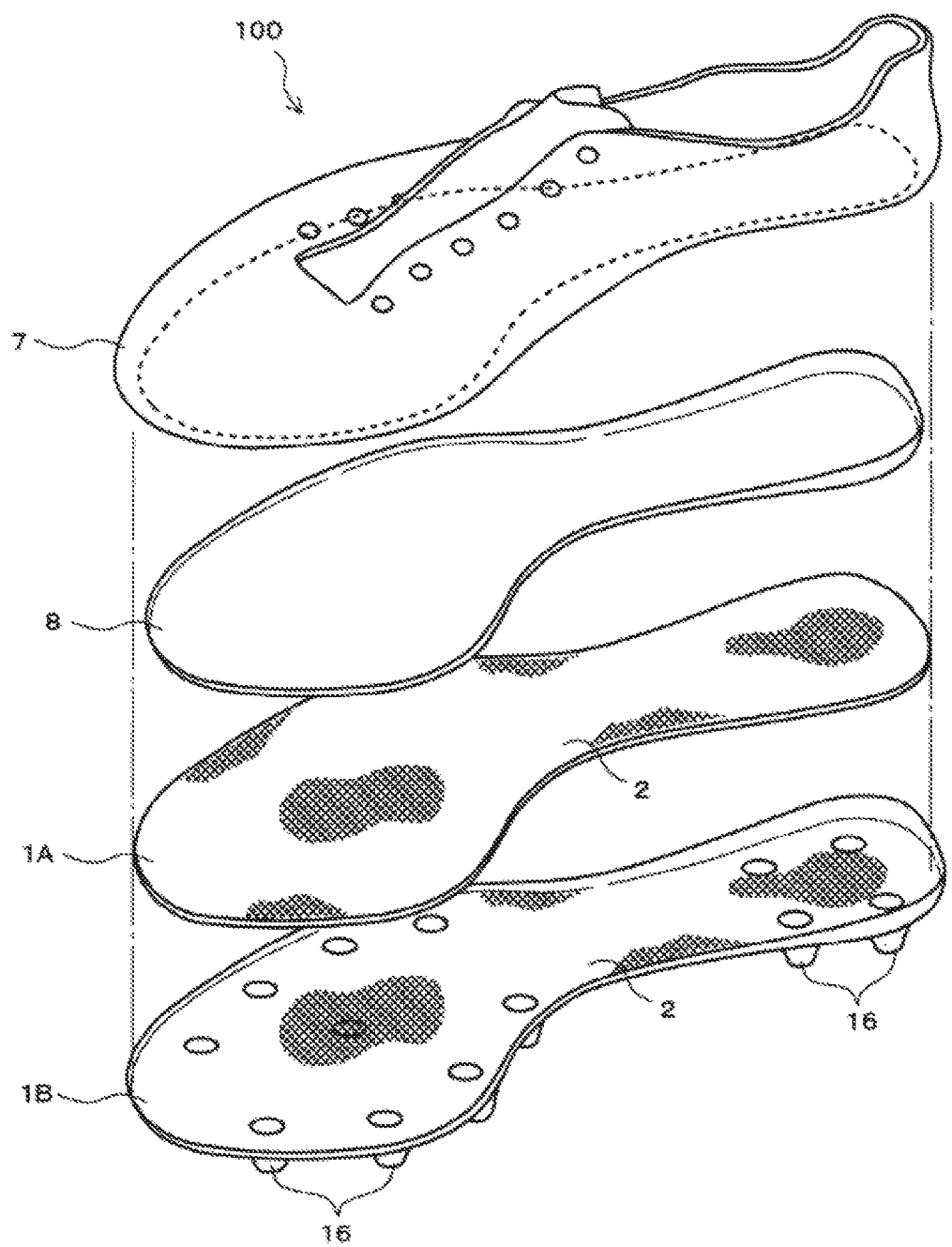
FIG. 16 is an exploded perspective view showing an embodiment of the shoe according to the present invention.

The shoe according to the present invention includes a shoe sole 1 formed of the above-mentioned layered sheet 2 in either or both of an insole 1A and an out sole 1B. FIG. 16 shows a shoe 100 comprising an insole 1A formed of a layered sheet 2 and an out sole 1B formed of a layered sheet 2. The shoe 100 is formed by bonding a vamp 7 and the insole 1A to the out sole 1B and attaching a sock liner 8 thereto. The shoe 100, comprising the shoe sole 1 formed of the layered sheet 2, can provide an effect provided by the shoe sole 1 shown in the first embodiment.

A cushioning material (not shown) may further be attached between the insole 1A and the sock liner 8 as required. FIG. 16 shows use of an out sole 1B according to the sixth embodiment shown in FIGS. 11 and 12 as an out sole 1B formed of the layered sheet 2, but the out sole 1B is not restricted to the sixth embodiment.

EXAMPLE

Examples of the present invention will be described, but the present invention is not restricted to these Examples.

Example 1

Using polypropylene as a high-melting point resin component (MFR=0.4 g/10 min., weight average molecular weight: Mw=630,000, melting peak temperature: 164° C.) and a propyleneethylene random copolymer as a low-melting point resin component (MFR=7.0 g/10 min., weight average molecular weight: Mw=220,000, melting peak temperature: 125° C.), a three-layer film, composed of two outer layers each formed of a low-melting point resin component and an intermediate layer formed of a high-melting point resin component (layer thickness ratio: 1/8/1), was obtained by inflation molding.

Both of the high-melting point resin component (polypropylene) and the low-melting point resin component (propyleneethylene random copolymer) were polyolefin, the same type of resin component.

The film obtained was slitted with a razor. Then, the film was stretched to 7 times on a hot plate at 110 to 120° C., and was subjected to 10% relaxation heat treatment in an oven with internal air circulation at 145° C. to obtain a flat yarn (yarn width: 4.5 mm, fineness: 1700 dt).

The flat yarn obtained was twill-weaved (15 warps/25.4 mm, 15 wefts/25.4 mm) to obtain a cloth, using a Sulzer weaving machine.

Meanwhile, a propyleneethylene random copolymer (MFR=7.0 g/10 min., weight average molecular weight: Mw=220,000, melting peak temperature: 125° C.) as a low-melting point resin component and polypropylene (MFR=1.9 g/10 min., weight average molecular weight: Mw=500,000, melting peak temperature: 161° C.) as a high-melting point resin component were mixed with a weight ratio of a low-melting point resin component: a high-melting point resin component=80:20 by inflation molding to obtain an adhesive film.

4 cloths obtained and 3 adhesive films obtained were layered alternately in the order of cloth/adhesive film/cloth/adhesive film/cloth/adhesive film/cloth to obtain a layered product.

The layered product obtained was hot pressed with an oil hydraulic press at a press temperature of 145° C. and a pressure of 5 MPa for 2 minutes, and cooled and pressed with an oil hydraulic press at a press temperature of 25° C. and a pressure of 5 MPa for 2 minutes to obtain a layered body.

A PET spun-lace non-woven fabric with a basis weight of 30 g/m2 and an EMA (ethylene-methyl acrylate copolymer) film with a thickness of 30 μm were layered on one surface of the layered body obtained in the order of layered body/EMA film/non-woven fabric, pressed with an oil hydraulic press at 125° C. and a pressure of 0.5 MPa for one minute, and pressed with an oil hydraulic press at 25° C. and a pressure of 0.5 MPa for one minute to obtain a layered sheet with a thickness of 1.3 mm.

After the layered sheet obtained was punched out in the form of a foot sole, the sheet was heated at 130° C., and as shown in FIG. 6, 4 ribs in the width direction of a front foot portion and 3 ribs in the length direction of a middle foot portion were press molded to obtain an insole (1), using an aluminum mold.

Example 2

The conditions were the same as in Example 1 except that 5 cloths and 4 adhesive films were layered alternately in the order of cloth/adhesive film/cloth/adhesive film/cloth/adhesive film/cloth/adhesive film/cloth, to obtain an insole (2) with a thickness of 1.6 mm.

Comparative Example 1

A pulp board with a thickness of 2 mm was punched out in the form of a foot sole to obtain an insole (3).

<Method of Evaluation>

Using the insoles (1) and (2) obtained in Examples 1 and 2 and the insole (3) obtained in Comparative Example 1, futsal shoes (sized 26.5 cm) were produced to evaluate the impact on the agility of a subject based on the following method of evaluation.

Each subject put on the shoes, and stood still with one foot forward (front foot) and the other foot backward (rear foot), taking a pace in between. Then, the subject kicked the floor with the front foot to step forward, which received the floor reaction force (Fz) in the vertical direction. Fz was measured with a Force Plate 9281B (Product from Kistler Holding AG). Assuming that an increase in Fz value becomes gradual upon bending of the MP joint, the time from bending of the MP joint until floor-leaving was measured. MP joint is referred to as a part that bends when a subject stands on tiptoe and raises the heel.

Each subject conducted 5 trials to measure the average time from bending of the MP joint until floor-leaving. The results are shown in Table 1 and FIG. 17.

TABLE 1

| | Time from bending of the MP joint until floor-leaving (sec) | | | | | |
|---|---|---|---|---|---|---|
| | Subject A: height; 173 cm weight; 79 kg | Subject B: height; 165 cm weight; 55 kg | Subject C: height; 173 cm weight; 72 kg | Subject D: height; 165 cm weight; 55 kg | Subject E: height; 173 cm weight; 75 kg | Subject F: height; 170 cm weight; 57 kg |
| Example 1 | 0.25 | 0.23 | 0.22 | 0.23 | 0.30 | 0.25 |
| Example 2 | — | — | — | — | 0.29 | 0.25 |
| Comparative Example 1 | 0.27 | 0.24 | 0.23 | 0.25 | 0.31 | 0.26 |

<Evaluation>

Figure 17:
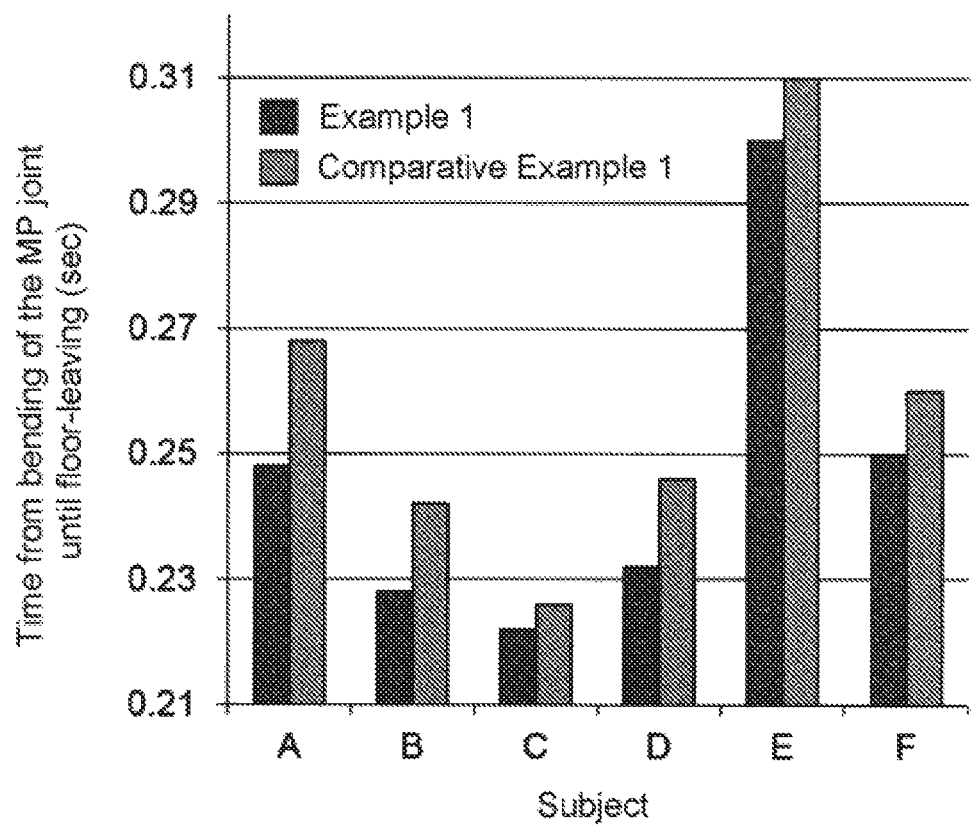
FIG. 17 is a graph showing the results of Examples and Comparative Examples.

Referring to Table 1 or FIG. 17, comparison of shoes formed of the insoles (1) and (2) obtained in Examples 1 and 2 and a shoe formed of the insole (3) obtained in Comparative Example 1 found that the time from bending of the MP joint until floor-leaving can be shortened to improve the agility.

Example 3

The conditions were the same as in Example 1 except that 3 cloths and 2 adhesive films were layered in the order of cloth/adhesive film/cloth/adhesive film/cloth alternately to obtain an insole (4) with a thickness of 1.0 mm.

<Method of Evaluation>

Using the insole (4) obtained in Example 3 and the insole (3) obtained in Comparative Example 1, running shoes (sized 26.5 cm) were produced to evaluate the running time in 20 m-run and the jump height in vertical jump in the gymnasium. The results are shown in Tables 2 and 3.

TABLE 2

| | Running Time (sec) | |
| --- | --- | --- |
| | Subject G: height; 171 cm weight; 63 kg | Subject H: height; 174 cm weight; 66 kg |
| Example 3 | 3.17 | 3.13 |
| Comparative Example 1 | 3.23 | 3.26 |

TABLE 3

| | Height of Jump (cm) | | |
| --- | --- | --- | --- |
| | Subject G: height; 171 cm weight; 63 kg | Subject H: height; 174 cm weight; 66 kg | Subject I: height; 175 cm weight; 68 kg |
| Example 3 | 46.5 | 48.5 | 44.5 |
| Comparative Example 1 | 44.8 | 45.9 | 40.4 |

<Evaluation>

Referring to Tables 2 and 3, comparison of a shoe formed of the insole (4) obtained in Example 3 and a shoe formed of the insole (3) obtained in Comparative Example 1 found that both of the running time and jump height were excellent to improve the kicking force and thrust.

The above Examples show the use of a layered sheet in an insole of a shoe, but a layered sheet with a thickness of 1.6 mm obtained in Example 2 can be used as an out sole of a shoe as well. Accordingly, by punching out the layered sheet in the form of an out sole to produce shoes, the same effects of improving the agility, kicking force and thrust as in the above Examples 1 to 3 can obviously be provided.

EXPLANATIONS OF LETTERS AND NUMERALS

1: Shoe sole
1A: Insole of a shoe
1B: Out sole of a shoe
11: Front foot portion
12: Middle foot portion
13: Rear foot portion
14: Rib
15: Rib
16: Spike
161: Filler
17: Nonslip lug
18: Counter
2: Layered sheet
21: Large layered sheet
22: Small layered sheet
3: Strand
3A: Warp
3B: Weft
31: Base layer
32: Surface layer
33: Thermoplastic resin of sea-island structure
4: Cloth
41: Large cloth
42: Small cloth
5: Mid layer
6: Out layer
7: Vamp
8: Sock liner
100: Shoe While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A shoe sole formed of a layered sheet of a plurality of cloths wherein; the cloths formed of a strand of an oriented thermoplastic resin; and the plurality of cloths are integrated by heating and compressing;
    wherein the strand contains a low-melting point resin component whose melting point is the same as or lower than the heating temperature and a high-melting point resin component whose melting point is higher than the heating temperature;
    wherein the low-melting point resin component and the high-melting point resin component are polyolefin; and
    wherein the integrated layered sheet is formed by disposing an adhesive film between a plurality of the cloths and melting part or all of the adhesive film.

2. The shoe sole according to claim 1, wherein either or both surfaces of the layered sheet are laminated with a non-woven fabric or crepe paper, or are subjected to surface roughening treatment.

3. The shoe sole according to claim 1, wherein a rib is formed in either or both of the longitudinal direction and the width direction.

4. The shoe sole according to claim 1, wherein at least one of the cloths contains a front foot portion, a middle foot portion and a rear foot portion and at least one of the cloths contains only a middle foot portion.

5. The shoe sole according to claim 1, wherein one of the plurality of cloths comprises a middle foot portion, a front foot portion and a rear foot portion wherein a thread count of the middle foot portion is different from a thread count of a front foot portion and a rear foot portion.

6. An insole of a shoe, comprising the shoe sole according to claim 1.

7. An out sole of a shoe, comprising the shoe sole according to claim 1.

8. The out sole of a shoe according to claim 7, wherein a spike protrudes on the layered sheet.

9. The out sole of a shoe according to claim 8, wherein the spike is molded so as to protrude on the bottom surface of the layered sheet, and a filler is filled in a recess on an opposing surface of the bottom surface.

10. The out sole of a shoe according to claim 7, wherein a counter formed of the layered sheet is integrally formed.

11. A shoe comprising the shoe sole according to claim 1.

* * * * *